(12) United States Patent
Takahashi (10) Patent No.: US 6,763,795 B2
(45) Date of Patent: Jul. 20, 2004

(54) OUTBOARD MOTOR ARRANGEMENT (75) Inventor: Masanori Takahashi, Shizuoka (JP)

(73) Assignee: Yamaha Marine Kabushiki Kaisha, Shizuoka (JP)

(*) Notice: Subject to any disclaimer, the term of this patent is extended or adjusted under 35 U.S.C. 154(b) by 167 days.

(21) Appl. No.: 10/005,984

(22) Filed: Nov. 7, 2001

(65) Prior Publication Data

US 2002/0072281 A1 Jun. 13, 2002

(30) Foreign Application Priority Data

Nov. 7, 2000 (JP) ........................................ 2000-338815

(51) Int. Cl.$^7$ ................................................. F02F 7/00
(52) U.S. Cl. ............................... 123/195 P; 123/198 C; 123/508
(58) Field of Search .................... 123/195 P, 195 A, 123/509, 516, 508, 456, 193.3, 198 C (56) References Cited

U.S. PATENT DOCUMENTS

| | | |
|---|---|---|
| 5,243,945 A | 9/1993 | Katoh et al. |
| 5,249,557 A | 10/1993 | Katoh et al. |
| 5,271,358 A | 12/1993 | Katoh et al. |
| 5,687,686 A | 11/1997 | Takahashi |
| 5,752,866 A | 5/1998 | Takahashi et al. |
| 5,755,606 A | 5/1998 | Takahashi et al. |
| 5,778,847 A | 7/1998 | Takahashi et al. |
| 5,829,402 A | 11/1998 | Takahashi et al. |
| 5,830,021 A | 11/1998 | Takahashi et al. |
| 5,855,193 A | 1/1999 | Takahashi |
| 5,878,726 A | 3/1999 | Takahashi et al. |
| 5,894,831 A | 4/1999 | Takahashi et al. |
| 5,899,197 A | 5/1999 | Watanabe et al. |
| 5,899,778 A | 5/1999 | Hiraoka et al. |
| 5,915,363 A | 6/1999 | Iwata et al. |
| 5,941,205 A | 8/1999 | Hiraoka et al. |
| 5,957,112 A | 9/1999 | Takahashi et al. |
| 6,030,262 A | 2/2000 | Okamoto et al. |
| 6,062,927 A | 5/2000 | Hiraoka et al. |
| 6,062,928 A | 5/2000 | Watanabe et al. |
| 6,082,336 A | 7/2000 | Takahashi et al. |
| 6,082,343 A | 7/2000 | Oishi et al. |
| 6,099,374 A | 8/2000 | Watanabe et al. |
| 6,109,231 A | 8/2000 | Watanabe et al. |
| 6,142,842 A | 11/2000 | Watanabe et al. |
| 6,148,787 A * | 11/2000 | Takano .................. 123/195 A |
| 6,152,119 A | 11/2000 | Hoshiba et al. |
| 6,186,108 B1 | 2/2001 | Takahashi et al. |
| 6,213,096 B1 | 4/2001 | Kato et al. |
| 6,213,829 B1 | 4/2001 | Takahashi et al. |
| 6,220,217 B1 | 4/2001 | Kato |
| 6,227,184 B1 | 5/2001 | Katayama et al. |
| 6,276,327 B1 | 8/2001 | Fukuoka et al. |
| 6,286,472 B1 | 9/2001 | Takahashi et al. |
| 6,286,476 B1 | 9/2001 | Hiraoka et al. |
| 6,296,536 B1 | 10/2001 | Katayama et al. |
| 6,298,815 B1 | 10/2001 | Kashima et al. |
| 6,321,711 B1 | 11/2001 | Kato |
| 6,325,037 B1 | 12/2001 | Takahashi et al. |

* cited by examiner

Primary Examiner—Tony M. Argenbright
Assistant Examiner—Katrina B. Harris
(74) Attorney, Agent, or Firm—Knobbe, Martens, Olson & Bear, LLP.

(57) ABSTRACT

An arrangement for a four-cycle, direct injected engine for an outboard motor is disclosed. In one embodiment, the engine is a V-type engine comprising first and second cylinder banks. A high pressure fuel pump is actuated by an intake camshaft of the first bank of cylinders. The engine includes a ventilation system with a lubricant separator being located in an upper portion of the second bank of cylinders. In another embodiment, the engine is an inline type engine. The fuel pump is actuated by the intake camshaft and the lubricant separator is located in an upper portion of an exhaust cam chamber.

68 Claims, 8 Drawing Sheets

OUTBOARD MOTOR ARRANGEMENT

PRIORITY INFORMATION

The present application is based on and claims priority to Japanese Patent Application No. 2000-338815, filed Nov. 7, 2000, which is hereby expressly incorporated by reference.

BACKGROUND OF THE INVENTION

1. Field of the Invention

This invention relates to an improved arrangement for an outboard motor, and more particularly to an improved arrangement for a four-cycle engine of an outboard motor.

2. Description of the Related Art

A typical outboard motor comprises a power head and a housing depending from the power head. The power head includes an internal combustion engine that drives a marine propulsion device (e.g., a propeller) through a driveshaft and a propulsion shaft, which are both journaled within the housing. The marine propulsion device is attached to the end of a propulsion unit, which extends from housing and is in a submerged position.

The internal combustion engine is typically covered by a protective cowling. The protective cowling typically comprises an upper portion and lower portion, which are removably mounted to each other by hooks or other coupling mechanisms, such as, for example, hooks. Accordingly, the upper portion can be removed from the lower portion such that the engine can be inspected and/or repaired. A general problem associated with outboard motors is that it is generally desirable to keep the height and width of the protective cowling as small as possible. As such, the space within the cowling is extremely limited. In this limited space, many engine components must be disposed.

There is an increasing emphasis on obtaining more effective emission control, better fuel economy and, at the same time, continued high or higher power output in outboard motors. Accordingly, four-cycle engines have started to replace two-cycle engines in outboard motors. In a similar manner, it has been suggested that direct fuel injection be used in outboard motors to further reduce emissions and improve performance. However, to date, it has been difficult to arrange all the components of a direct-injected four-cycle engine into the limited of space of an outboard motor cowling.

SUMMARY OF THE INVENTION

Accordingly, one aspect of the present invention is a four-cycle engine for powering an outboard motor. The engine comprises a plurality of combustion chambers arranged generally vertically above one another. The combustion chambers are formed by at least an engine body, a cylinder head assembly and a piston that moves relative to the engine body and the cylinder head assembly. A crankshaft that extends in a generally vertical direction is coupled to the piston such that movement of the piston causes the crankshaft to rotate. At least one air intake port and at least one exhaust port communicate with the combustion chamber. An intake valve moves between an open and closed position. An exhaust valve moves between an open and closed position. An valve actuating mechanism includes an intake camshaft capable of moving the intake valves and an exhaust cam shaft capable of moving the exhaust valves. A head cover assembly covers the valve actuating mechanism and defines, at least in part, a cam chamber. A fuel injection system comprises a fuel injector communicating with each combustion chamber and arranged to deliver fuel directly to the combustion chamber. The fuel system also includes a fuel pump that communicates with at least one of the fuel injectors. The fuel pump is actuated, at least partially, by rotation of the intake cam shaft or the exhaust cam shaft and is positioned at least partially within the cam chamber.

Another aspect of the present invention is a four-cycle engine for powering an outboard motor. The engine comprises a plurality of combustion chambers arranged generally vertically above one another. The combustion chambers are formed by at least an engine body, a cylinder head assembly and a piston that moves relative to the engine body and the cylinder head assembly. A crankshaft that extends in a generally vertical direction is coupled to the piston such that movement of the piston causes the crankshaft to rotate. At least one air intake port and at least one exhaust port communicate with the combustion chamber. An intake valve moves between an open and closed position. An exhaust valve moves between an open and closed position. An valve actuating mechanism includes an intake camshaft capable of moving the intake valves and an exhaust cam shaft capable of moving the exhaust valves. A head cover assembly covers the valve actuating mechanism and defines, at least in part, a cam chamber. A fuel injection system comprises a fuel injector communicating with each combustion chamber and arranged to deliver fuel directly to the combustion chamber. The fuel system also includes a fuel pump that communicates with at least one of the fuel injectors. The fuel pump is located at partially within the cam chamber and is positioned generally between adjacent cylinder. The fuel pump has a longitudinal axis that is slanted towards a cylinder axis extending through the adjacent cylinders.

DETAILED DESCRIPTION OF THE PREFERRED EMBODIMENT

Figure 1:
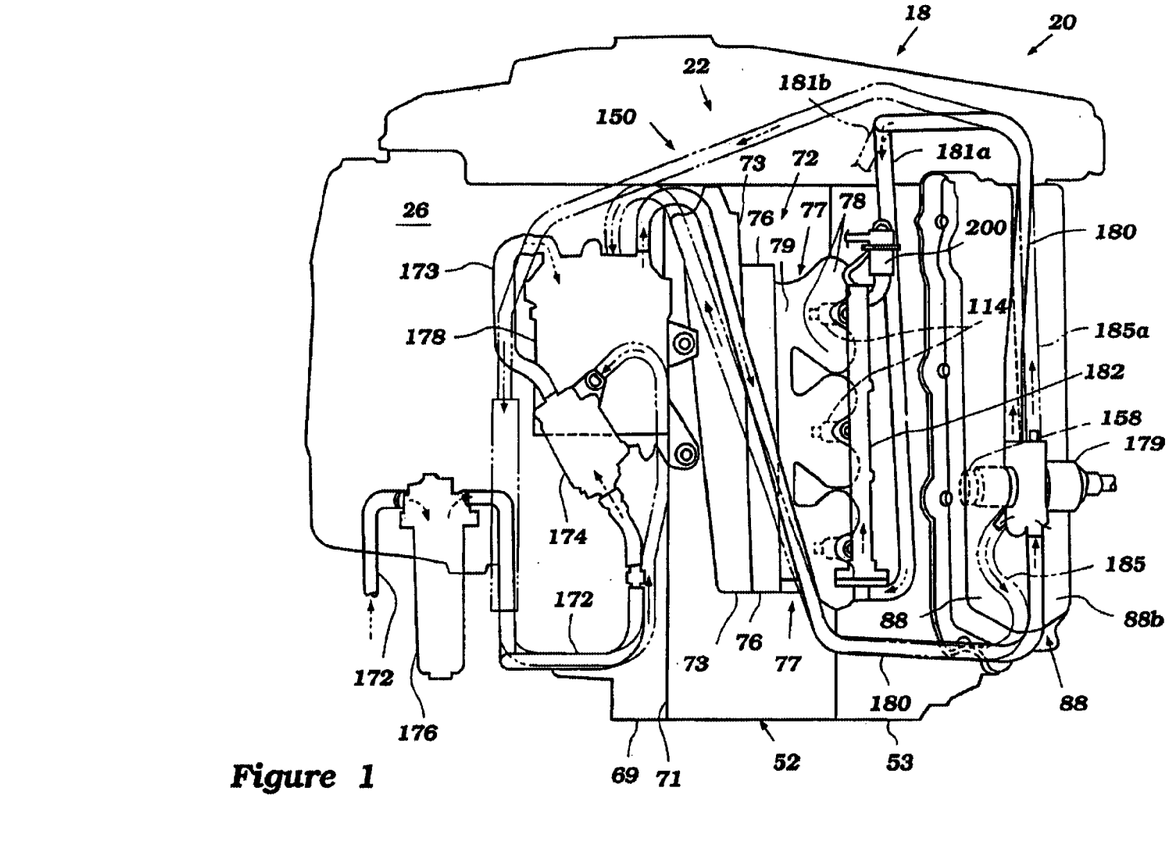
FIG. 1 is a side elevational view of a power head of an outboard motor having an engine with certain features and advantages according to the present invention.

FIG. 1 is a side elevational view of a power head 18 of an outboard motor 20 powered by an engine 22 having certain features and advantages according to the present invention. Although the engine 22 is shown in the context of an outboard motor, various aspect and features of the present invention can also be applied to engines in other compact environments such as, for example, marine drive units (e.g., a stern drive unit) and land vehicles.

The illustrated outboard motor 20 is of the type utilized to propel a watercraft (not shown). The power head 18 preferably includes a protective cowling assembly 21 (partially shown in FIG. 1), which surrounds the engine 22 and defines an engine compartment 26. As is typical in the art, a lower unit extends downwardly from the cowling assembly 21. The lower unit comprises an upper or "driveshaft housing" section (not shown) and a lower section (not shown).

Figure 2:
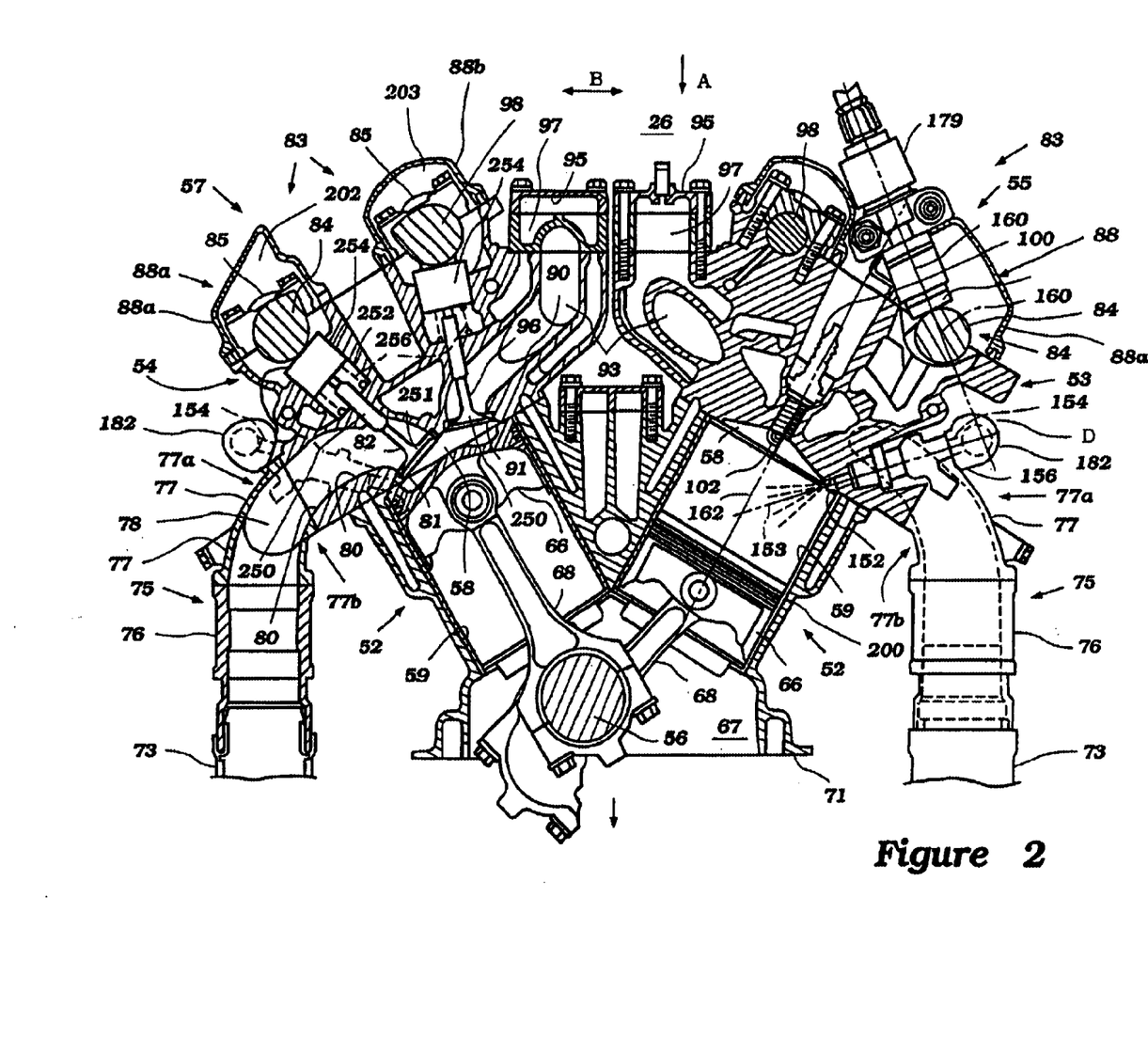
FIG. 2 is a cross-sectional view of the engine of FIG. 1.

With reference to FIGS. 1 and 2, the illustrated engine 22 operates on a four-stroke cycle combustion principle. The engine 22 comprises a cylinder block 52 with a left cylinder head assembly 53 and a right cylinder head assembly 54 that are coupled to the cylinder block 52 to form left and right cylinder banks 55, 57. It should be noted that "left" and "right" as designated as viewed facing the rear of the engine in the direction the arrow labeled A in FIG. 2. The cylinder banks 55, 57 define a valley that faces away from the watercraft to which the motor 20 is attached. In the illustrated arrangement, each bank defines three cylinders 59, each having a combustion chamber 58 defined in the space between the cylinder 59, its corresponding cylinder head assemblies 53, 54, and a piston 66 movably positioned in the cylinder 59.

The three cylinders of the left and right cylinder banks 55, 57 are preferably offset from each other. That is, with the crankshaft 56, the first, second and third cylinders 59 of the right cylinder bank 57 are preferably positioned higher than the respective first, second, and third cylinders 59 of the left cylinder bank 55. As such, the right cylinder bank 57 is the "higher" cylinder bank.

As may be appreciated by those skilled in the art, the engine 22 may have a greater or lesser number of cylinders, such as two, four, or eight or more and be arranged in other than "V" fashion, such as in an in-line arrangement as will be described below. In addition, while the cylinder block is shown as unitary component, it is understood that it can be formed by a plurality of elements and thus constitute an assembly (i.e., a cylinder block assembly).

As illustrated in FIG. 2, each piston 66 is connected to a connecting rod 68 that is coupled to a vertically extending crankshaft 56. The crankshaft 56 is connected to a top end of a driveshaft, (not shown), which extends downwardly through the lower unit, where it can drive, for example, a bevel gear and a conventional forward-neutral-reverse transmission. A control (not shown) is preferably provided for allowing an operator to remotely control the transmission from the watercraft.

The transmission drives a propeller shaft, which is journaled within the lower section of the lower unit in a known manner. A hub of a propeller is coupled to the propeller shaft for providing a propulsive force to the watercraft in a manner well known in this art.

With continued reference to FIGS. 1 and 2, the crankshaft 56 is journaled for rotation with respect to the cylinder block 52. A crankcase cover 69 engages an end 71 of the block 52 generally opposite the heads 53, 54. The crankcase cover 69 and the cylinder block 52 define a crankcase chamber 67 within which the crankshaft 56 rotates. The crankcase cover 69 may be attached to the cylinder block 52 by bolts or similar means for attaching known to those skilled in the art. The crankcase chamber 67 is positioned generally opposite the heads 53, 54 and on the side of the engine closest to the watercraft 24. Although not illustrated, a flywheel is preferably maintained in position on the top end of the crankshaft 56.

The engine 22 includes an induction intake system 72 for providing air charge to each combustion chamber 58. The illustrated intake system 72 is generally positioned at the crankcase or watercraft end of the engine 22 on both sides of the engine 22. Air passes through a vent (not shown) in the protective cowling into a pair of inlets (not shown), which lead to a pair of silencers 73 which are positioned on both sides of the engine 22.

As best illustrated in FIG. 2, an intake pipe 75 extends from the silencer 73 along the side of the engine 22. A throttle body 76 is provided in the intake pipe 75 for controlling the flow of air into the combustion chambers 58. The throttle body 76 preferably comprises a moveable plate (see the embodiment illustrated in FIG. 6, which will be describe in detail below) that extends controlled through a cable by the operator of the watercraft.

As best illustrated in FIG. 1, a manifold 77 includes has a main part 79 that is connected to the throttle body 76. Two individual branches 78 preferably extend from the main part 79 to an intake passage 80 (see FIG. 2) in the cylinder head assemblies 53, 54 leading to one of the combustion chambers 58. As such, in the illustrated arrangement, each combustion chamber 58 is associated with two intake passages 80 and each intake passage 80 is associated with an intake valve opening 81 (see also FIG. 3), which is exposed to the combustion chamber 58. With particular reference to FIG. 2, the manifold 77 preferably bends towards the cylinder had 53, 54 defining and outer bend portion 77a and an inner bend portion 77b. The outer bend portion 77a generally faces away from the engine 22 toward the cowling while the inner bend portion generally faces toward the engine 22 and the cylinder body 52.

With continued reference to FIG. 2, there is at least one intake valve 82 associated with each intake passage 80. In the illustrated arrangement, all of the intake valves 82 for each bank of cylinders are preferably actuated by a single intake camshaft 84. The intake camshaft 84 is mounted for rotation with respect to its respective cylinder head assemblies 53, 54 and is connected thereto with at least one bracket 85. Each intake camshaft 84 rotates within an enclosure defined by the cylinder head assembly 53, 54 and a cover assembly 83, which in the illustrated arrangement comprises an intake camshaft cover 88a connected to the cylinder head assembly.

Each valve 82 preferably has a head 251 which is adapted for seating against the intake valve opening 81, and a stem 250 extending from the head through a valve guide 252 to a follower 254. A spring 256 is positioned between the follower 254 and a portion of the cylinder head assembly 53, 54 for biasing the valve 82 upwardly into a position in which the valve 82 closes the passage 80.

An exhaust system is provided for routing the products of combustion within the combustion chambers 58 to a point external to the engine 22. In the illustrated arrangement, two exhaust ports 91 (see FIG. 3) are associated with each combustion chamber 58. Exhaust passages 90 lead from each exhaust port 91 to an exhaust manifold 93, which is defined in part by a jacket 95 that is attached to the cylinder head assembly 53, 54. The jacket 95 preferably includes cooling passages 97 for cooling the exhaust gases.

As shown in FIG. 2, at least one exhaust valve 96 is associated with each exhaust port 91. Like the intake valves 82, the exhaust valves 96 of each cylinder bank are preferably all actuated by a single exhaust camshaft 98. Each exhaust camshaft 98 is journaled for rotation with respect to its respective cylinder head assembly 53, 54 and connected thereto with at least one bracket 85. Each exhaust camshaft 98 is enclosed within the cover assembly, which in the illustrated arrangement includes an exhaust camshaft cover 88b, which defines an exhaust camshaft chamber 203.

As with the intake valve 82, each exhaust valve 96 preferably includes a head 251 for selective positioning against a valve seat in the passage 90. A stem 250 extends from the head of the valve 96 through a valve guide 252 in the cylinder head assembly 53, 54. A follower 254 is positioned at the opposite end of the stem 250 for engagement by the camshaft 98. A spring 256 is positioned between the follower and the cylinder head assembly 53, 54 for biasing the valve 96 into a position in which the valve closes the passage 90.

Although not illustrated, means are provided for driving the camshafts 84, 98. This means for driving may be of a variety of types known to those skilled in the art, such as a toothed gear mounted on the crankshaft, a similar gear mounted to each camshaft, and a timing chain extending in engagement with the gears whereby the crankshaft drives the camshafts.

The remainder of the exhaust system includes an exhaust guide (not shown), which is in communication with the exhaust manifold 93 and is positioned at the bottom end of the engine 22. The exhaust guide has a passage extending therethrough which communicates with the common exhaust passage. The common exhaust passage extends through the valley of the engine and is defined by the cylinder block 52. An exhaust pipe is connected to the bottom side of the exhaust guide in alignment with the passage therethrough. The exhaust pipe terminates within a chamber of a muffler. The muffler is preferably positioned within the lower unit near the driveshaft. An exhaust gas outlet is provided in the bottom end of the muffler, through which the exhaust gas is routed through the hub of the propeller to a point external of the motor 20.

A suitable ignition system is provided for igniting an air and fuel mixture within each combustion chamber 58. Such systems are well known to those skilled in the art. The illustrated ignition system may includes a spark plug 100, which is positioned in the cylinder head assembly 53, 54 and includes an electrode 102 exposed to the combustion chamber 58. The sparkplug 100 is used to ignite the air and fuel mixture within each combustion chamber 58.

The engine 22 preferably also includes a suitable cooling system. In such a system, the cooling liquid is preferably water drawn from the body of water in which the motor 22 is positioned. The water is pumped through a water inlet by a water pump positioned in the lower unit. The pump is preferably driven by the driveshaft and expels the cooling liquid upwardly through a cooling liquid supply pipe. The coolant flows through the supply pipe from the pump to one or more coolant passages (e.g., the passages 97 in the jacket 95) for cooling the cylinder head assembly 53, 54, block 52, and exhaust system.

The cooling system may include a pressure valve (not shown) positioned along the coolant path for diverting coolant through a relief passage and thereon to the coolant drain system in the event the coolant pressure exceeds a predetermined high pressure. In addition, the cooling system may include a thermostat positioned along the coolant path for monitoring the temperature of the coolant. The thermostat is preferably and arranged so that if the coolant temperature is high, the thermostat is opened to allow coolant to flow though the engine 22 at a high rate. On the other hand, if the temperature of the coolant is low, then the thermostat is closed, allowing the engine to warm up. The coolant is preferably returned through a discharge into the body of water.

The engine 22 includes a lubricating system for providing lubricant to the various portions of the engine. For example, the lubricating system can include an oil reservoir positioned below the engine 22. The reservoir is in communication with an oil pump via a suction tube. The oil pump is drivingly positioned on the end of the crankshaft 56 at the bottom of the engine 22. Seals are provided for sealing the oil pump with respect to the remainder of the engine 22. The oil pump draws lubricant from the reservoir and then delivers it through a connecting passage through galleries leading throughout the engine. The lubricant is then arranged to drain back to the reservoir for reuse. A portion of the cooling system may be arranged to cool the lubricant in the reservoir.

A fuel supply system is provided for delivering fuel to each combustion chamber 58. With reference to FIGS. 1–4, fuel is pumped from a fuel source, such as a tank on board the watercraft 24, through a supply line 172 by a low pressure pump 174. This pump 174 may be of the diaphragm type. Preferably, the pumped fuel is passed through a filter 176 positioned along the line 172.

The fuel is delivered by the pump 174 through a fuel line 173 to an inlet of a vapor separator 178. The vapor separator 178 is adapted to separate liquid fuel from vapor in any known manner. An electric pump (not shown) within the vapor separator supplies fuel through a fuel supply pipe 180 to a high pressure pump 179.

The high pressure pump 179, which will be described in more detail below, delivers fuel under high pressure to a high pressure hose 180, which preferably extends generally upwardly from the high pressure pump 180 to a location above the cylinder head assembly 53, 54. Two branch hoses 181a,b branch off from the high pressure hose 180 and extend downwardly to the lowest cylinders where they are connected to a pair of substantially vertical fuel conduits or rails 182. Each fuel rail 182 extends adjacent to one of the cylinder banks 55, 57 and supplies fuel under pressure to the fuel injectors 114. An inlet 154 to the fuel injectors 114 is connected to the fuel rails 182 through a fuel rail port 156 (see FIG. 3).

Figure 3:
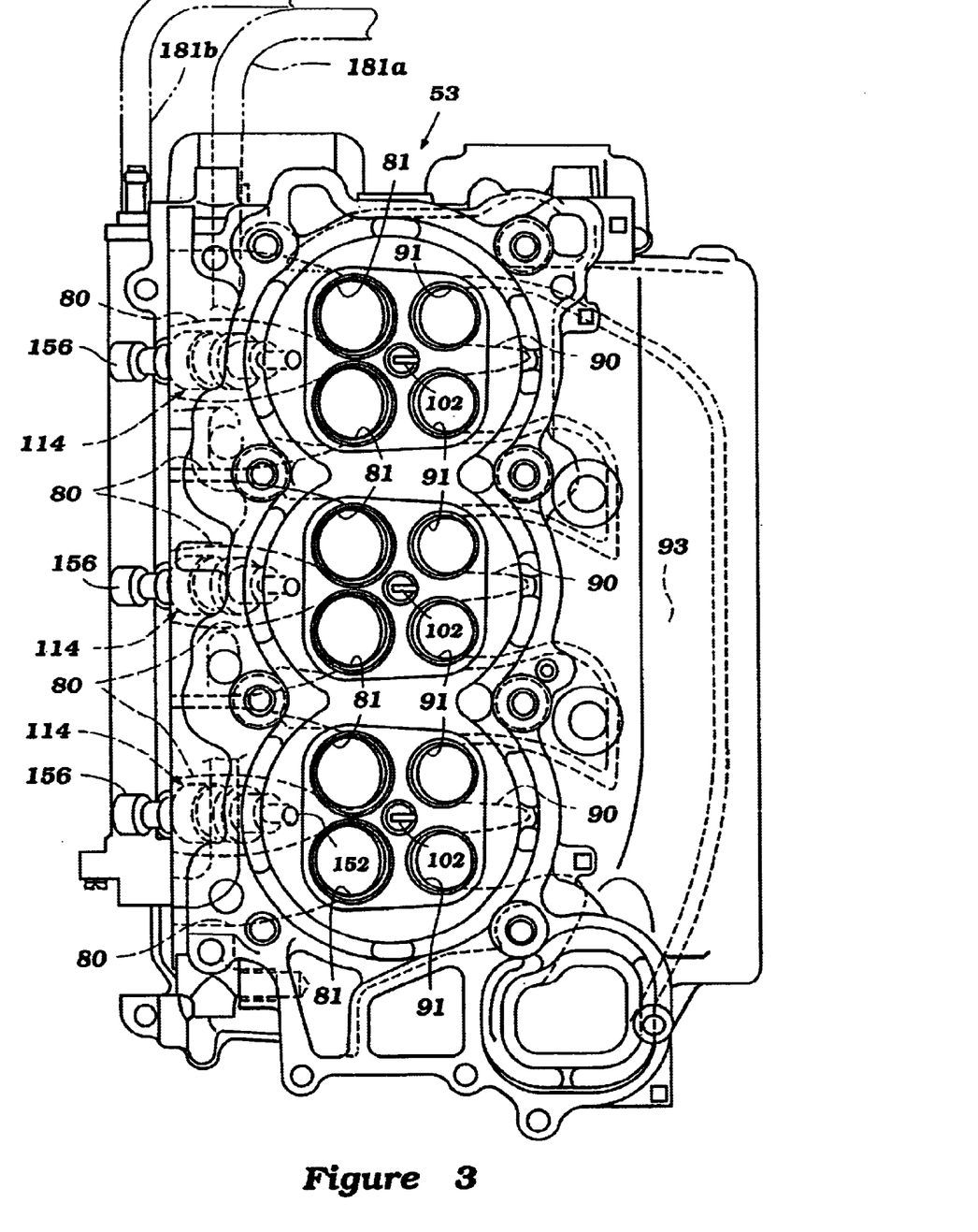
FIG. 3 is a side elevational view a portion of a cylinder head assembly of the engine of FIG. 1.
Figure 4:
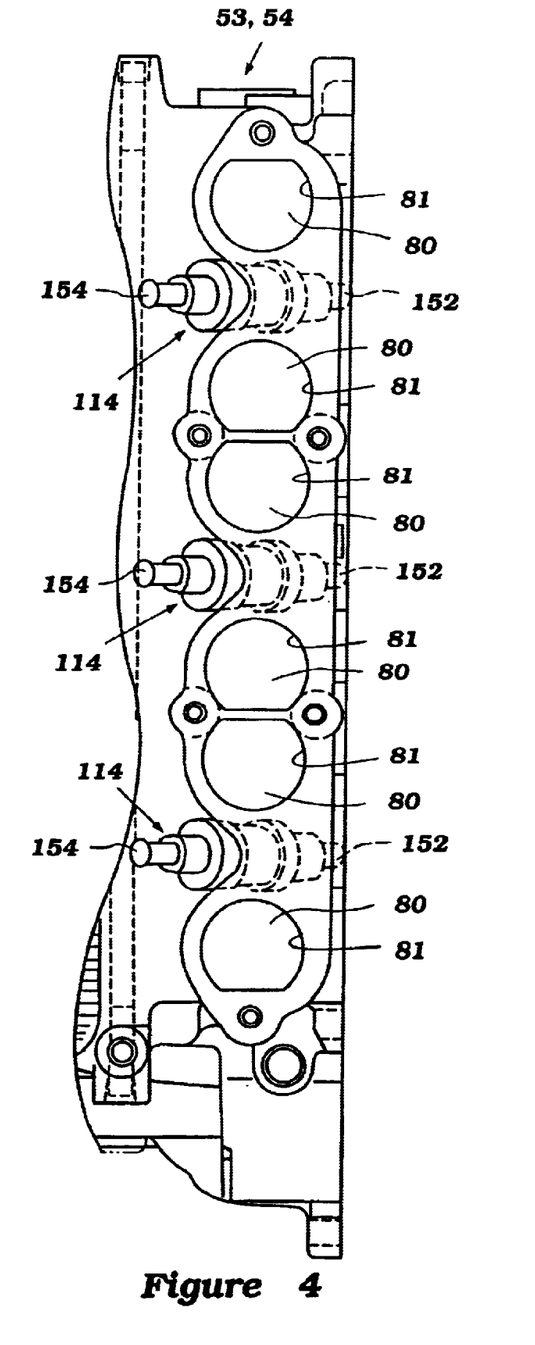
FIG. 4 is a side view of the cylinder head assembly of the engine of FIG. 1.

As shown in FIGS. 2–4, the fuel injectors 114 are preferably arranged to inject fuel directly into the combustion chambers 58. This direct injection arrangement requires that the fuel be supplied to the injectors at a relatively high pressure such as, for example, a pressure within the range of 50 to 150 kg/cm$^2$.

The fuel injectors 114 are preferably located between adjacent branch portions 78 of the manifold 77. More specifically, the fuel injectors 114 are arranged so that injection nozzles 152 of the fuel injector 114 are located between the two intake ports 81 associated with each combustion chamber 58. As best seen in FIG. 2, the injection nozzles 152 are preferably arranged such that a spray axis 153 is directed towards the center longitudinal axis 162 of the cylinder 59. Moreover, the fuel rails 182 are preferably located adjacent the outer bend portion 77a of the manifold 77, within a recess "D" defined by the outer bend portion 77a and the cylinder head assembly 53. This arrangement is preferred because it is compact.

Figure 5:
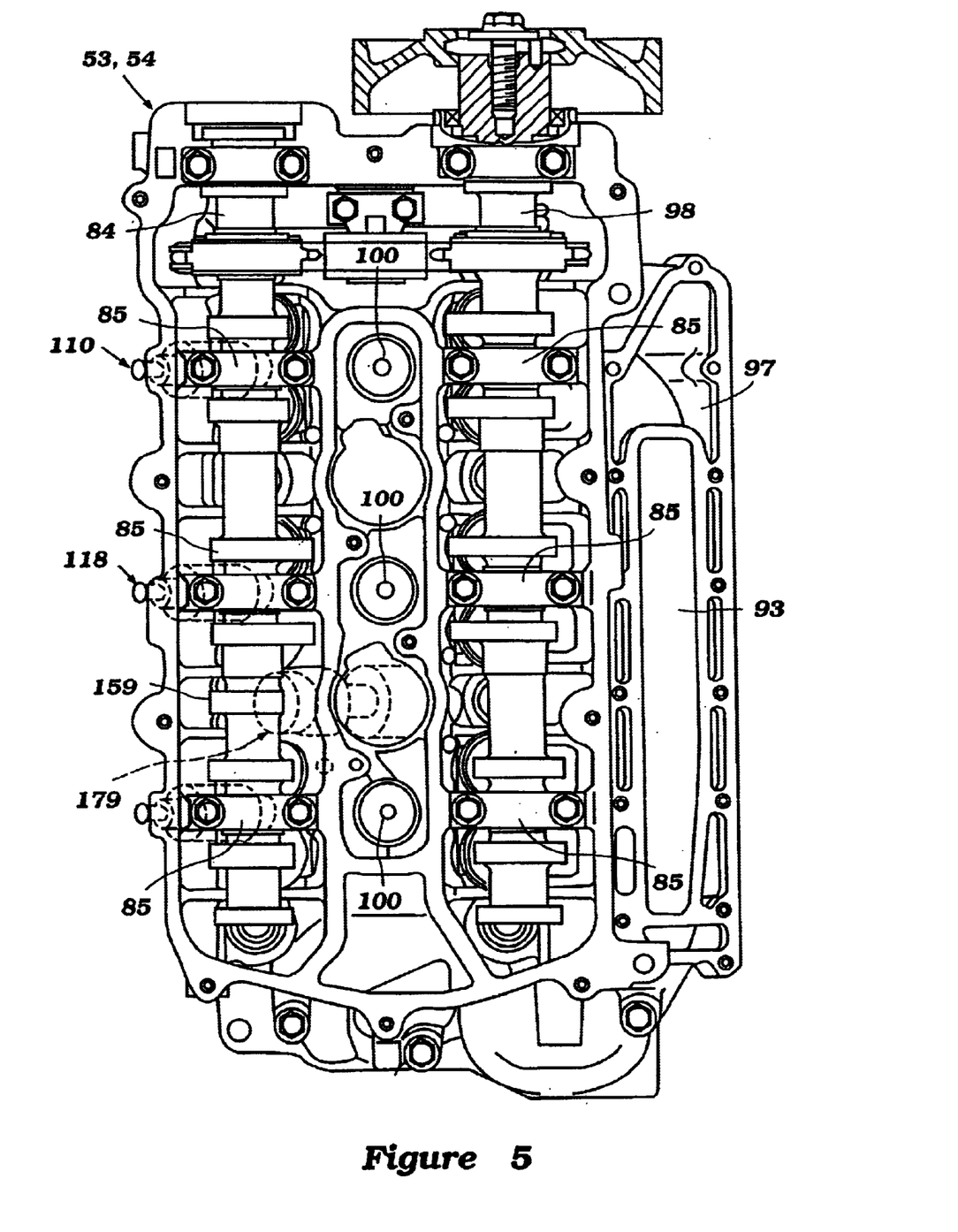
FIG. 5 is a side view of the intake and exhaust camshafts of the engine of FIG. 1.

The high pressure pump 179 is preferably driven by the intake camshaft 84 of the left cylinder bank 55. For example, in the illustrated arrangement, the high pressure pump 179 includes a plunger 158, which is actuated by a pump cam 159 on intake camshaft 84 (see FIG. 5). The plunger 158 preferably moves along a longitudinal axis 160 of the fuel injector. Rotation of the camshaft 84 causes reciprocal motion of the plunger 158 along the longitudinal axis 160, which powers the high pressure pump in a known manner. To conserve space, the high pressure pump 179 and the plunger 158 are positioned at least partially within the intake camshaft cover 88a. Moreover, the high pressure pump 179 and the plunger are arranged to incline toward the center of the engine 22. That is, the longitudinal axis 160, which is slanted towards a cylinder axis 162 of the left cylinder bank 55. That is, the high pressure pump 179 is arranged such that its longitudinal axis 160 lies transverse to the cylinder axis 162. More preferably, the longitudinal axis 160 forms an acute angle with the cylinder axis 162. Most preferably, the longitudinal axis 160 forms an angle of approximately 45 degrees with the cylinder axis 162. In this arrangement, the high-pressure pump 179 does not project directly towards the cross-direction as identified by arrow B (see FIG. 2) of the engine nor does it project directly towards the rear of the engine 22. As such, this arrangement reduces the size of the engine and increases the available space within the cowling for other components. It should also be noted that the high pressure pump 179 is preferably located generally in-between adjacent cylinders 59.

As mentioned above, the high pressure pump 170 is preferably driven by the intake camshaft 84 of the left cylinder bank 55, which is the lower cylinder bank. Moreover, with reference to FIG. 1, the high pressure pump 179 is preferably positioned the adjacent one of the lower cylinders 66. For example, in the illustrated arrangement, the high pressure pump 179 is located generally between the second and third cylinders 66 of the left cylinder bank 55. As will be explained below, this arrangement generally preferred because it also reduces the size of the engine 22.

The high pressure fuel pump 179 is continuously driven by the engine 22, thus maintaining a high fuel pressure in the fuel rails 182. The fuel supply system 150 preferably includes a pressure regulator 200, which in the illustrated arrangement is connected to an upper end of the fuel rail (see FIG. 1). When the pressure within the pump 179 exceeds a desired limit, the regulator 200 opens an access and some of the contents of the fuel pump 179 are dumped through a return line 185a to low pressure pump 174. As shown in FIG. 2, the illustrated return line 185a extends upwardly from the high pressure pump 179 to and extends forward above the engine 22 where it is connected to the regulator 200. The return line 185a then extends downwardly past the vapor separator 178 and the bottom of the engine. The return line 185a ultimately extends upwardly where it connects to the low pressure pump 174. A second return line 185 preferably extends from the high pressure fuel pump 179 and the vapor separator 178 along the left side of the engine 22.

The illustrated engine 22 preferably also includes a blow-by gas ventilation system for collecting the blow-by gases and returning them to the induction system as is well known in the art. The ventilation system generally comprises a series of conduits, which connect various components in which blow-by gases collect (e.g., the crankcase chamber 67). In particular, in the illustrated arrangement, these components are in communication with the right intake cam chamber 202, which is defined by the intake cam cover 88a of the right cylinder bank 57 (i.e., the higher cylinder bank).

Figure 6:
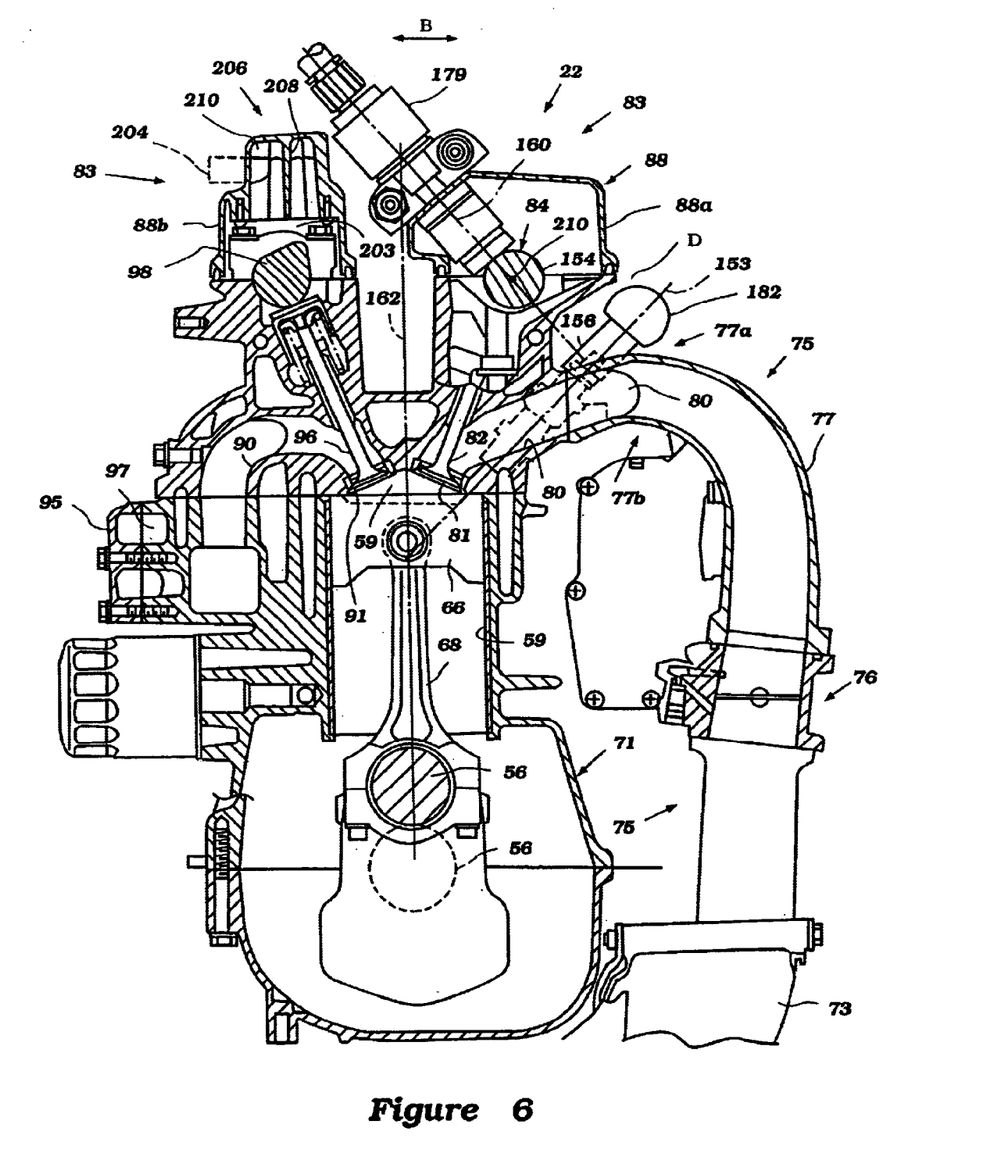
FIG. 6 is a cross-sectional view of a modified embodiment of an engine for an outboard motor having certain features and advantages according to the present invention.

In a manner similar to that illustrated in FIG. 6, the intake cam chamber 202 includes an outlet 204, which is connected to the induction system 75 so that the blow-by gases can be burned with an intake charge. The intake cam chamber 202 preferably includes a lubricant separator 206, which is preferably located at one of the higher points in the engine. The lubricant separator 260 preferably includes one or more baffles 208, which define a tortuous path 210 for the blow-by-gases as they move from the intake cam chamber 202 to the outlet 204. This path 210 act to separate lubricant from the blow-by gases such that they can be returned to the lubricant system. Advantageously, the lubricant separator 206 is located in the upper end portion of the intake cam chamber 202 of the cylinder bank 57 opposite where the high pressure fuel pump 179 is located. More preferably, the lubricant separator 206 is located on the right or higher bank 57 while the high pressure pump is located on the left or lower cylinder side 55. This arrangement is preferred because it also results in a more compact engine design.

Figure 7:
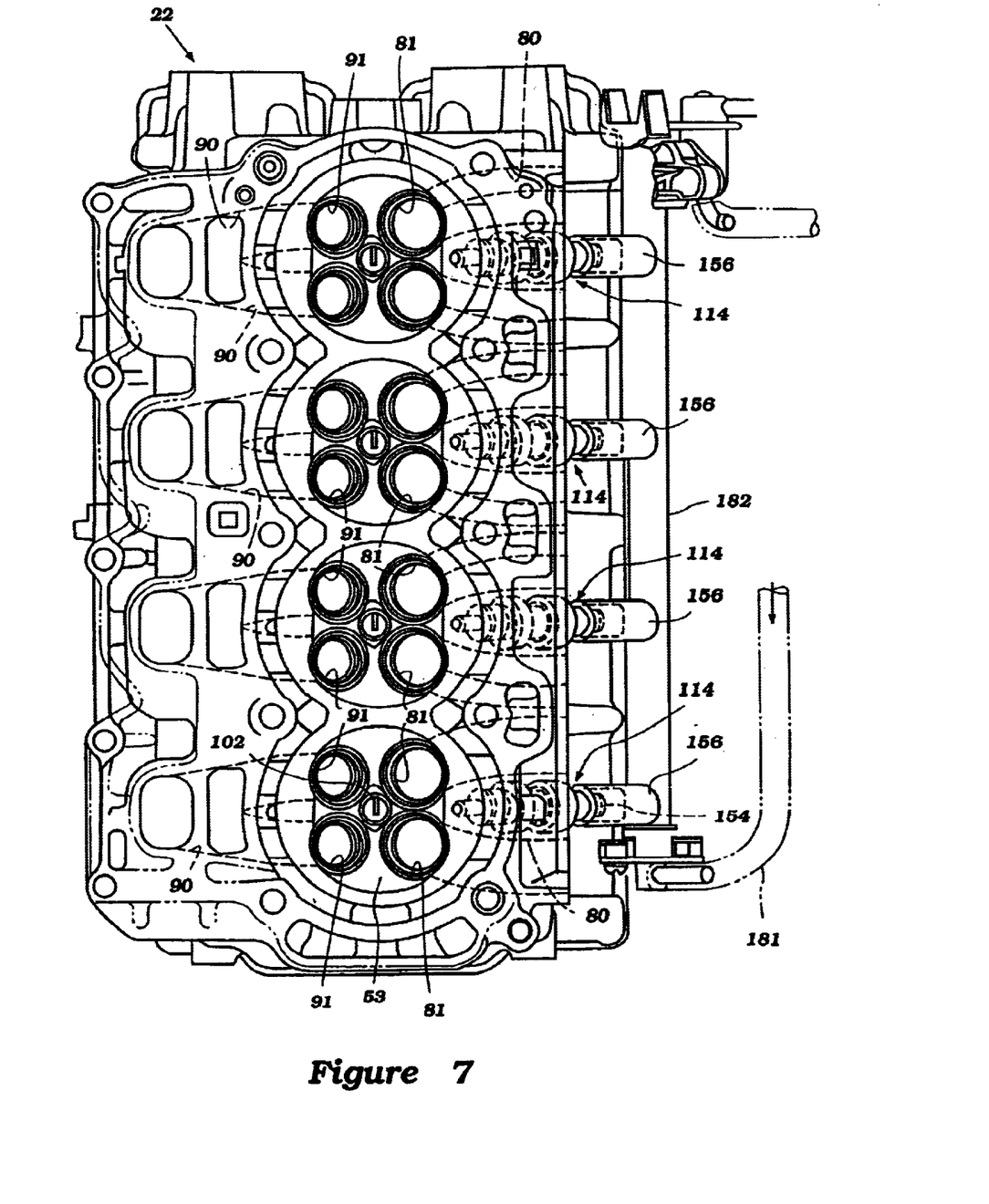
FIG. 7 is a side elevational view a portion of a cylinder head assembly of the engine of FIG. 6.
Figure 8:
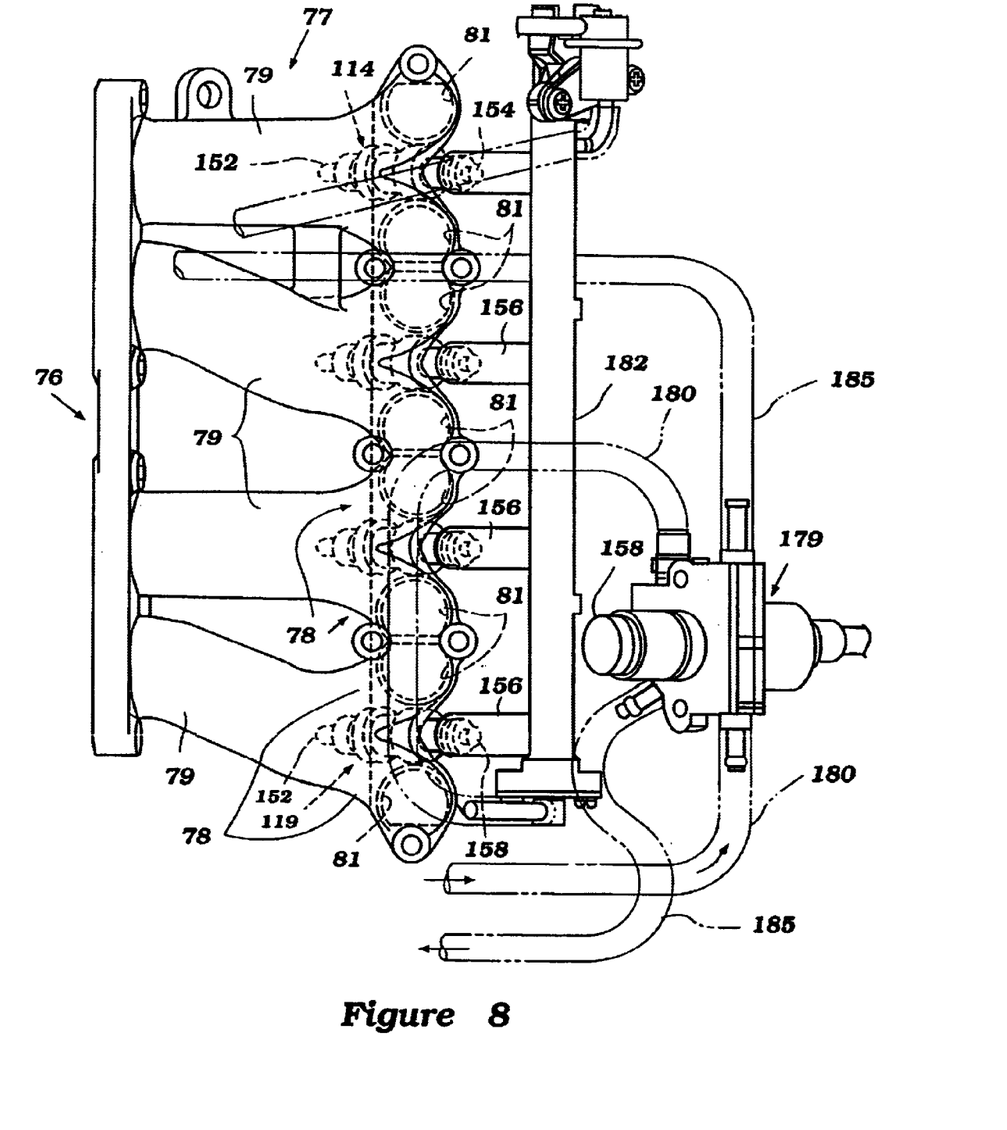
FIG. 8 is a elevational view of a portion of the engine of FIG. 1 showing the intake passages and the high pressure fuel pump.

With reference now to FIGS. 6–8, a modified embodiment of an engine 22 having certain features and advantages according to the present invention is illustrated. In describing this embodiment, like numbers will be used to refer to components similar to those described with respect to FIG. 1–5.

As best seen in FIG. 6, in this embodiment, the engine 22 is of the four-cycle, four-cylinder, in-line type. That is, the four cylinders 59 are arranged on top of each other in a direction parallel to the crankshaft 56. Unlike the previous embodiment, the engine 22 includes a single cam shaft 84 and exhaust shaft 98. Moreover, the induction system is positioned generally one side of the engine 22.

As with the previous embodiment, the induction system preferably includes a silencer 73 and an intake pipe 75, which extends from the silencer 73 along the side of the engine 22. A throttle body 76 is provided in the intake pipe 75 for controlling the flow of air into the combustion chambers 58. A manifold 77 extends from the throttle body 76. Each manifold 77 has a main part 79 that is connected to the throttle body 76. Two individual branches 78 preferably extend from the main part 79. Each branch 78 extending to an intake passage 80 (see FIG. 7) in the cylinder head assembly 53, 54 leading to one of the combustion chambers 58. As such, in the illustrated arrangement, each combustion chamber 58 is associated with two intake passages 80 and each intake passage 80 is associated with an intake valve opening 81 (see also FIG. 6 and 7), which is exposed to the combustion chamber 58.

With particular reference to FIG. 6, the manifold 77 preferably bends towards the cylinder had 53, 54 defining and outer bend portion 77a and an inner bend portion 77b. The outer bend portion 77a generally faces away from the engine 22 toward the cowling while the inner bend portion generally faces toward the engine 22 and the cylinder body 52.

As with the previous embodiment, the fuel injectors 114 are preferably located between adjacent branch portions 78 of the manifold 77. More specifically, the fuel injectors 114 are arranged so that injection nozzles 152 of the fuel injector 114 are located between the two intake ports 81 associated with each combustion chamber 58. And, as best seen in FIG. 6, the injection nozzles 152 are preferably arranged such that a spray axis 153 is directed towards the center longitudinal axis 162 of the cylinder 59. Moreover, the fuel rails 182 are preferably located adjacent the outer bend portion 77a of the manifold 77, within a recess "D" defined by the outer bend portion 77a and the cylinder head assembly 53. This arrangement is preferred because it is compact.

Similar to the previous embodiment, the high pressure pump 179 is preferably driven by the intake camshaft 84 and positioned at least partially within the intake camshaft cover 88a. Moreover, to conserve space, the high pressure pump 179 and the plunger 158 are arranged to incline toward the center of the engine 22. That is, the high pressure pump 179 has a longitudinal axis 160, which is slanted towards a cylinder axis 162 of the left cylinder bank 55 such that its longitudinal axis 160 lies transverse to the cylinder axis 162. More preferably, the longitudinal axis 160 forms an acute angle with the cylinder axis 162. In addition, the high pressure pump 179 is preferably arranged such that its longitudinal axis is arranged generally perpendicular to the axis 210 of the intake camshaft 84. As such, in this arrangement, the high-pressure pump 179 does not project directly towards the cross-direction (arrow B) of the engine nor does it project directly towards the rear of the engine 22 and lies generally between the intake and exhaust camshafts 84, 98. This arrangement reduces the size of the engine and increases the available space within the cowling for other components. It should also be noted that the high pressure pump 179 is preferably located generally in-between adjacent cylinders 59.

As with the previous arrangement, the engine 22 includes a lubricant separator 206. To provide space for the high pressure pump, the lubricant separator 206 in this embodiment is located in an upper end of the exhaust head cover 88b. The lubricant separator 260 preferably includes one or more baffles 208, which define a tortuous path 210 for the blow-by-gases as they move from the intake cam chamber 202 to the outlet 204. This path 210 acts to separate lubricant from the blow-by gases such that they can be returned to the lubricant system.

Of course, the foregoing description is that of preferred embodiments of the invention, and various changes and modifications may be made without departing from the spirit and scope of the invention, as defined by the appended claims.

What is claimed is:

1. A four-cycle engine for powering an outboard motor, the engine comprising a plurality of combustion chambers arranged generally vertically above one another, each of the combustion chambers being formed by at least in part by a portion of an engine body, a portion of a cylinder head assembly and a piston that moves relative to the engine body and the cylinder head assembly, a crankshaft that extends in a generally vertical direction and is coupled to the pistons such that movement of the pistons causes the crankshaft to rotate, at least one air intake port and at least one exhaust port communicating with a respective one of the plurality of the combustion chambers, a plurality of intake valves each being moveable between a open and closed position relative to the respective intake port, a plurality of exhaust valves each being moveable between an open and closed position relative to the respective exhaust port, a valve actuating mechanism that includes an intake camshaft capable of moving at least one of the intake valves and an exhaust camshaft capable of moving at least one of the exhaust valves, a head cover assembly covering the valve actuating mechanism and defining, at least in part, a cam chamber, a fuel injection system that comprises a plurality of fuel injectors, each fuel injector communicating with a respective one of the combustion chambers and arranged to deliver fuel to the combustion chamber, a fuel pump communicating with at least one of the fuel injectors, the fuel pump being actuated, at least partially, by rotation of the intake camshaft or the exhaust camshaft and being positioned at least partially within the cam chamber, and an induction system for supplying an intake air charge to the at least one intake port, the induction system including an intake manifold with a bent portion, the bent portion defining an outer bent section that generally faces away from the engine body and an inner bent section that generally faces the engine body, a fuel rail communicating with the fuel pump and with at least one of the fuel injectors and being disposed within a space defined between the outer bent section and the head cover assembly.

2. The engine of claim 1, wherein the fuel pump is actuated by the intake camshaft.

3. The engine of claim 1, wherein the head cover assembly comprises an intake camshaft cover for covering the intake camshaft and defining an intake camshaft chamber and an exhaust camshaft cover for covering the exhaust camshaft and defining an exhaust camshaft chamber.

4. The engine of claim 3, wherein the fuel rail is positioned within a space between the outer bent section and the intake camshaft cover of the head cover assembly.

5. The engine of claim 3, further comprising a ventilation system for removing blow-by gases, the ventilation system comprising a lubricant separator positioned in an upper portion of the exhaust camshaft chamber.

6. The engine of claim 5, wherein the fuel pump is located below the lubricant separator.

7. The engine of claim 6, wherein the fuel pump is located between a lowermost pair of adjacent combustion chambers.

8. The engine of claim 3, wherein the fuel pump is actuated by the intake camshaft.

9. The engine of claim 8, wherein the fuel pump is positioned at least partially within the intake camshaft chamber.

10. The engine of claim 1, wherein the fuel pump is positioned substantially between the intake camshaft and the exhaust camshaft.

11. The engine of claim 1, wherein the fuel pump includes a plunger which is actuated by the rotation of the intake camshaft or the exhaust camshaft.

12. The engine of claim 11, wherein the plunger moves along a longitudinal axis of the fuel pump, the longitudinal axis of the fuel pump being positioned generally perpendicular to an axis of one of the intake and exhaust camshafts.

13. The engine of claim 12, wherein the longitudinal axis of the fuel pump is positioned generally perpendicular to the axis of the intake camshaft.

14. The engine of claim 1, wherein the engine block and the cylinder head assembly cooperate to define a first cylinder bank containing at least one cylinder and a second cylinder bank also containing at least one cylinder, the first and second cylinder banks arranged generally in a "V"-shape, the first and second cylinder banks being offset vertically from each other such that the first cylinder bank is lower than the second cylinder bank.

15. The engine of claim 14, wherein the fuel pump is actuated by an exhaust camshaft or an intake camshaft of the first cylinder bank.

16. The engine of claim 14, wherein the head cover assembly comprises an intake camshaft cover for coving the intake camshaft and defining an intake camshaft chamber and an exhaust camshaft cover for covering the exhaust camshaft and defining an exhaust camshaft chamber.

17. The engine of claim 16, wherein the fuel rail is positioned within a space defined between the outer bent portion and the intake camshaft cover of the head cover assembly.

18. The engine of claim 14, wherein the head cover assembly comprises a first part for covering the intake and exhaust camshafts associated with the first cylinder bank and defining a first chamber and a second part for covering the intake and exhaust camshafts associated with the second cylinder bank and defining a second chamber.

19. The engine of claim 18, further comprising ventilation system for removing blow-by gases, the ventilation system comprising a lubricant separator positioned on an upper portion of the second part of the cylinder head assembly of the second cylinder block.

20. The engine of claim 19, wherein the fuel pump is located below the lubricant separator.

21. The engine of claim 19, wherein the fuel pump is located between a lowermost pair of cylinders of the second cylinder bank.

22. The engine of claim 14, wherein the fuel pump is actuated by the intake camshaft.

23. The engine of claim 22, wherein the fuel pump is positioned at least partially within an intake camshaft chamber of the head cover assembly.

24. The engine of claim 22, wherein the fuel pump includes a plunger which is actuated by the rotation of the intake camshaft or the exhaust camshaft.

25. The engine of claim 24, wherein the plunger moves along a longitudinal axis of the fuel pump, the longitudinal axis of the longitudinal fuel pump being positioned traverse to an axis of the intake camshaft.

26. The engine of claim 24, wherein the plunger moves along a longitudinal axis of the fuel pump, the longitudinal axis of the longitudinal fuel pump being positioned traverse to a cylinder axis of an adjacent cylinder.

27. The engine of claim 26, wherein the longitudinal axis of the fuel pump and the cylinder axis of the adjacent cylinder forms an acute angle.

28. The engine of claim 27, wherein the longitudinal axis and the cylinder axis form an angle of approximately 45 degrees.

29. A four-cycle engine for powering an outboard motor, the engine comprising a plurality of combustion chambers arranged generally vertically above one another, each of the combustion chambers being formed by at least in part by a portion of an engine body, a portion of a cylinder head assembly and a piston that moves relative to the engine body and the cylinder head assembly, a crankshaft that extends in a generally vertical direction and is coupled to the pistons such that movement of the piston causes the crankshaft to rotate, at least one air intake port and at least one exhaust port communicating with a respective one of the plurality of the combustion chambers, a plurality of intake valves each being moveable between an open and closed position relative to the respective intake port, a plurality of exhaust valves each being moveable between an open and closed position relative to the respective exhaust port, an valve actuating mechanism that includes an intake camshaft capable of moving at least one of the intake valves and an exhaust camshaft capable of moving at least one of the exhaust valves, a head cover assembly covering the valve actuating mechanism and defining, at least in part, a cam chamber, a fuel injection system that comprises a plurality of fuel injectors, each fuel injector communicating with a respective one of the combustion chambers and being arranged to deliver fuel to the combustion chamber, a fuel pump communicating with at least one of the fuel injectors, the fuel pump being located at least partially within the cam chamber and being positioned generally between adjacent combustion chambers and having a longitudinal axis that is slanted relative to a longitudinal axis extending through the adjacent combustion chambers.

30. The engine of claim 29, wherein the fuel pump is actuated by the intake camshaft.

31. The engine of claim 29, including an induction system for supplying an intake air charge to the at least one intake port, the induction system including an intake manifold with a bent portion, the bent portion defining an outer bent section that generally faces the cover assembly and an inner bent section that generally faces the engine body, a fuel rail connected to the fuel pump and at least one of the fuel injectors and being positioned within a space defined between the outer bent section and the head cover assembly.

32. The engine of claim 31, wherein the head cover assembly comprises an intake camshaft cover for covering the intake camshaft and defining an intake camshaft chamber and an exhaust camshaft cover for covering the exhaust camshaft and defining an exhaust camshaft chamber.

33. The engine of claim 31, including a fuel rail connecting to the fuel pump and at least one of the fuel injectors and wherein the fuel rail is positioned within a space between the outer bent section and the intake camshaft cover.

34. The engine of claim 29, wherein the head cover assembly comprises an intake camshaft cover for covering the intake camshaft and defining an intake camshaft chamber and an exhaust camshaft cover for covering the exhaust camshaft and defining an exhaust camshaft chamber.

35. The engine of claim 34, further comprising a ventilation system for removing blow-by gases, the ventilation system comprising a lubricant separator positioned in an upper portion of the exhaust camshaft chamber.

36. The engine of claim 29, wherein the engine block and the cylinder head assembly cooperate to define a first cylinder bank containing at least one cylinder and a second cylinder bank also containing at least one cylinder, the first and second cylinder banks arranged generally in a "V"-shape the first and second cylinder banks being offset vertically from each other such that the first cylinder bank is lower than the second cylinder bank.

37. The engine of claim 36, wherein the fuel pump is actuated by an exhaust camshaft or an intake camshaft of the first cylinder bank.

38. The engine of claim 36, further comprising an induction system for supplying an intake air charge to the at least one intake port, the induction system including an intake manifold with a bent portion, the bent portion defining an outer bent section that generally faces the head cover assembly and an inner bent section that generally faces the engine body, the fuel rail being positioned within a space defined between the outer bent section and the head cover assembly.

39. The engine of claim 38, wherein the head cover assembly comprises an intake camshaft cover for covering the intake camshaft and defining an intake camshaft chamber and an exhaust camshaft cover for covering the exhaust camshaft and defining an exhaust camshaft chamber.

40. The engine of claim 39, wherein a fuel rail is connected to the fuel pump and at least one of the fuel injectors, the fuel rail being positioned within a space defined between the outer bent portion and the intake camshaft cover.

41. The engine of claim 36, wherein the head cover assembly comprises a first part for covering the intake and exhaust camshafts associated with the first cylinder bank and defining a first chamber and a second part for covering the intake and exhaust camshafts associated with the second cylinder bank and defining a second chamber.

42. The engine of claim 41, further comprising ventilation system for removing blow-by gases, the ventilation system comprising an lubricant separator positioned on an upper portion of the second part of the cylinder head assembly.

43. The engine of claim 42, wherein the fuel pump is located below the lubricant separator.

44. A four-cycle engine for powering an outboard motor, the engine comprising a plurality of combustion chambers arranged generally vertically above one another, each of the combustion chambers being formed by at least in part by a portion of an engine body, a portion of a cylinder head assembly and a piston that moves relative to the engine body and the cylinder head assembly, a crankshaft that extends in a generally vertical direction and is coupled to the pistons such that movement of the pistons causes the crankshaft to rotate, at least one air intake port and at least one exhaust port communicating with respective one of the plurality of the combustion chambers, a plurality of intake valves each being moveable between an open and closed position relative to the respective intake valve, a plurality of exhaust valves each being moveable between an open and closed position relative to the respective exhaust valve, a valve actuating mechanism that includes an intake camshaft capable of moving at least one of the intake valves and an exhaust camshaft capable of moving at least one of the exhaust valves, a head cover assembly covering the valve actuating mechanism and defining, at least in part, a cam chamber, a fuel injection system that comprises a plurality of fuel injectors, each fuel injector communicating with a respective one of the combustion chambers and arranged to deliver fuel to the combustion chamber, a fuel pump communicating with at least one of the fuel injectors, the fuel pump being actuated, at least partially, by rotation of the intake camshaft or the exhaust camshaft and being positioned at least partially within the cam chamber, wherein the fuel pump is actuated the intake camshaft.

45. The engine of claim 44, wherein the head cover assembly comprises an intake camshaft cover for coving the intake camshaft and defining an intake camshaft chamber and an exhaust camshaft cover for covering the exhaust camshaft and defining an exhaust camshaft chamber.

46. The engine of claim 45, further comprising a ventilation system for removing blow-by gases, the ventilation system comprising a lubricant separator positioned in an upper portion of the exhaust camshaft chamber.

47. The engine of claim 45, wherein the fuel pump is located below the lubricant separator.

48. The engine of claim 47, wherein the fuel pump is located between a lowermost pair of adjacent combustion chambers.

49. A four-cycle engine for powering an outboard motor, the engine comprising a plurality of combustion chambers arranged generally vertically above one another, each of the combustion chambers being formed by at least in part by a portion of an engine body, a portion of a cylinder head assembly and a piston that moves relative to the engine body and the cylinder head assembly, a crankshaft that extends in a generally vertical direction and is coupled to the pistons such that movement of the pistons causes the crankshaft to rotate, at least one air intake port and at least one exhaust port communicating with respective one of the plurality of the combustion chambers, a plurality of intake valves each being moveable between an open and closed position relative to the respective intake port, a plurality of exhaust valves each being moveable between an open and closed position relative to the respective exhaust port, a valve actuating mechanism that includes an intake camshaft capable of moving at least one of the intake valves and an exhaust camshaft capable of moving at least one of the exhaust valves, a head cover assembly covering the valve actuating mechanism and defining, in part, a cam chamber, a fuel injection system that comprises a plurality of fuel injectors, each fuel injector communicating with a respective one of the combustion chambers and arranged to deliver fuel to the combustion chamber, a fuel pump communicating with at least one of the fuel injectors, the fuel pump being actuated, at least partially, by rotation of the intake camshaft or the exhaust camshaft and being positioned at least partially within the cam chamber, wherein the engine block and the cylinder head assembly cooperate to define a first cylinder bank containing at least one cylinder and a second cylinder bank also containing at least one cylinder, the first and second cylinder banks arranged generally in a "V"-shape, the first and second cylinder banks being offset vertically from each other such that the first cylinder bank is lower than the second cylinder bank.

50. The engine of claim 49, wherein the fuel pump is actuated by an exhaust camshaft or an intake camshaft of the first cylinder bank.

51. The engine of claim 49, further comprising an induction system for supplying an intake air charge to the at least one intake port, the induction system including an intake manifold with a bent portion, the bent portion defining an outer bent section that generally faces the cover assembly and an inner bent section that generally faces the engine body, the fuel rail being positioned within a space defined between the outer bent section and the engine body.

52. The engine of claim 51, wherein the head cover assembly comprises an intake camshaft cover for coving the intake camshaft and defining an intake camshaft chamber and an exhaust camshaft cover for covering the exhaust camshaft and defining an exhaust camshaft chamber.

53. The engine of claim 52, wherein a fuel rail is connected to the fuel pump and at least one of the fuel injectors, the fuel rail being positioned within a space defined between the outer bent portion and the intake camshaft cover.

54. The engine of claim 49, wherein the head cover assembly comprises a first part for covering the intake and exhaust camshafts associated with the first cylinder bank and defining a first chamber and a second part for covering the intake and exhaust camshafts associated with the second cylinder bank and defining a second chamber.

55. The engine of claim 54, further comprising ventilation system for removing blow-by gases, the ventilation system comprising an lubricant separator positioned on an upper portion of the second part of the cylinder head assembly.

56. The engine of claim 55, wherein the fuel pump is located below the lubricant separator.

57. The engine of claim 55, wherein the fuel pump is located between a lowermost pair of cylinders.

58. The engine of claim 49, wherein the fuel pump is actuated by the intake camshaft.

59. The engine of claim 58, wherein the fuel pump is positioned at least partially within the intake camshaft chamber.

60. The engine of claim 58, wherein the fuel pump includes a plunger which is actuated by the rotation of the intake camshaft or the exhaust camshaft.

61. The engine of claim 60, wherein the plunger moves along a longitudinal axis of the fuel pump, the longitudinal axis of the fuel pump being positioned traverse to an axis of the intake camshaft.

62. The engine of claim 60, wherein the plunger moves along a longitudinal axis of the fuel pump, the longitudinal axis of the longitudinal fuel pump being positioned traverse to a cylinder axis of an adjacent cylinder.

63. The engine of claim 60, wherein the longitudinal axis and the cylinder axis forms acute angle.

64. The engine of claim 63, wherein the longitudinal axis and the cylinder axis form an angle of approximately 45 degrees.

65. A four-cycle engine for powering an outboard motor, the engine comprising a plurality of combustion chambers arranged generally vertically above one another, each of the combustion chambers being formed by at least in part by a portion of an engine body, a portion of a cylinder head assembly and a piston that moves relative to the engine body and the cylinder head assembly, a crankshaft that extends in a generally vertical direction and is coupled to the pistons such that movement of the pistons causes the crankshaft to rotate, at least one air intake port and at least one exhaust port communicating with respective one of the plurality of the combustion chambers, a plurality of intake valves each being moveable between an open and closed position relative to the respective intake port, a plurality of exhaust valves each being moveable between an open and closed position relative to the respective exhaust port, a valve actuating mechanism that includes an intake camshaft capable of moving at least one of the intake valves and an exhaust camshaft capable of moving at least one of the exhaust valves, a head cover assembly covering the valve actuating mechanism and defining, at least in part, a cam chamber, a fuel injection system that comprises a plurality of fuel injectors, each fuel injector communicating with a respective one of the combustion chambers and arranged to deliver fuel to the combustion chamber, a fuel pump communicating with at least one of the fuel injectors, the fuel pump being actuated, at least partially, by rotation of the intake camshaft or the exhaust camshaft and being positioned at least partially within the cam chamber, the rotation of the intake or exhaust camshaft causing reciprocal motion in the fuel pump along a longitudinal axis that is positioned generally perpendicular to an axis of rotation of one of the intake and exhaust camshafts.

66. The engine of claim 65, wherein the longitudinal axis is skewed towards the axis of the other of the camshafts.

67. The engine of claim 65, wherein the cylinder block and the cylinder head assembly cooperate to define a first cylinder bank containing at least one cylinder and a second cylinder bank also containing at least one cylinder, the first and second cylinder banks arranged generally in a "V"-shape, the first and second cylinder banks being offset vertically from each other such that the first cylinder bank is lower than the second cylinder bank.

68. The engine of claim 65, further comprising an induction system for supplying an intake air charge to the intake ports, the induction system including an intake manifold with a bent portion, the bent portion defining an outer bent section that generally faces the cover assembly and an inner bent section that generally faces the engine body, a fuel rail connected to the fuel pump and at least one of the fuel injectors and being positioned within a space defined between the outer bent section and the cover assembly.

* * * * *

UNITED STATES PATENT AND TRADEMARK OFFICE
CERTIFICATE OF CORRECTION

PATENT NO.       : 6,763,795 B2
APPLICATION NO.  : 10/005984
DATED            : July 20, 2004
INVENTOR(S)      : Takahashi It is certified that error appears in the above-identified patent and that said Letters Patent is hereby corrected as shown below:

| Column | Line | Description of Error |
|---|---|---|
| 1 | 63 | After "position." Delete "An" and insert - - A - -, therefor. |
| 2 | 20 | After "position." Delete "An" and insert - - A - -, therefor. |
| 2 | 52 | After "is" delete "a" and insert - - an - -, therefor. |
| 10 | 52 | In Claim 16, delete "coving" and insert - - covering - -, therefor. |
| 12 | 29 | In Claim 36, after "shape" insert - - , - -. |
| 13 | 27 | In Claim 44, after "actuated" insert - - by - -. |
| 13 | 29 | In Claim 45, delete "coving" and insert - - covering - -, therefor. |
| 14 | 23 | In Claim 52, delete "coving" and insert - - covering - -, therefor. |
| 14 | 39 | In Claim 55, after "comprising" delete "an" and insert - - a - -, therefor. |
| 14 | 62 | In Claim 63, delete "forms" and insert - - form - -, therefor. |

UNITED STATES PATENT AND TRADEMARK OFFICE
CERTIFICATE OF CORRECTION

PATENT NO. : 6,763,795 B2
APPLICATION NO. : 10/005984
DATED : July 20, 2004
INVENTOR(S) : Takahashi It is certified that error appears in the above-identified patent and that said Letters Patent is hereby corrected as shown below:

14            62            In Claim 63, after "forms" insert - - an - -.

Signed and Sealed this

Twenty-ninth Day of August, 2006

JON W. DUDAS
*Director of the United States Patent and Trademark Office*